United States Patent
Rakhmailov et al.

(10) Patent No.: US 6,272,844 B1
(45) Date of Patent: Aug. 14, 2001

(54) GAS TURBINE ENGINE HAVING A BLADED DISK

(75) Inventors: Anatoly Rakhmailov, Bataysk (RU); Valentin Yaishnikov; Mikhail Kolotilenko, both of Zaporozh's (UA); Oleg Rakhmailov; Igor Drozd, both of Rostov-Don (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/267,896

(22) Filed: Mar. 11, 1999

(51) Int. Cl.$^7$ ....................................................... F02C 3/00
(52) U.S. Cl. ......................... 60/39.75; 416/95; 416/96 R
(58) Field of Search ................................... 60/39.36, 737, 60/39.75; 415/115; 416/9 S, 96 R, 97 R

(56) References Cited

U.S. PATENT DOCUMENTS

| | | |
|---|---|---|
| 1,388,707 | 8/1921 | Heinze . |
| 1,868,143 | 7/1932 | Heinz . |
| 2,303,381 | 12/1942 | New . |
| 2,579,049 | 12/1951 | Price . |
| 2,784,551 | 3/1957 | Karlby et al. . |
| 2,821,067 | 1/1958 | Hill . |
| 2,823,520 | 2/1958 | Spalding . |
| 3,280,555 | 10/1966 | Charpentier et al. . |
| 3,287,904 | 11/1966 | Warren et al. . |
| 3,469,396 | 9/1969 | Onishi et al. . |
| 3,613,360 | * 10/1971 | Howes ................................... 415/95 |
| 3,727,401 | 4/1973 | Fincher . |
| 3,751,911 | 8/1973 | De Tartaglia . |
| 3,775,974 | 12/1973 | Silver . |
| 3,826,084 | 7/1974 | Branstrom et al. . |
| 3,886,732 | 6/1975 | Gamell . |
| 3,971,209 | 7/1976 | de Chair . |
| 4,024,705 | 5/1977 | Hedrick . |
| 4,084,922 | 4/1978 | Glenn . |
| 4,142,836 | 3/1979 | Glenn . |
| 4,277,938 | 7/1981 | Belke et al. . |
| 4,338,780 | 7/1982 | Sakamoto et al. . |
| 4,338,781 | 7/1982 | Belke et al. . |
| 4,501,053 | 2/1985 | Craig et al. . |
| 4,549,402 | 10/1985 | Saintsbury et al. . |
| 4,817,858 | 4/1989 | Verpoort . |
| 4,991,391 | 2/1991 | Kosinski . |
| 5,054,279 | 10/1991 | Hines . |
| 5,232,335 | 8/1993 | Narayama et al. . |
| 5,310,319 | * 5/1994 | Grant et al. ............................. 416/95 |
| 5,331,803 | * 7/1994 | Shekleton ............................ 60/39.36 |
| 5,473,881 | 12/1995 | Kramnik et al. . |
| 5,575,616 | * 11/1996 | Hagle et al. .......................... 415/115 |
| 6,047,540 | * 4/2000 | Dev ..................................... 60/39.75 |

FOREIGN PATENT DOCUMENTS

| | | |
|---|---|---|
| 2332698 | 1/1974 | (DE) . |
| 2335594 | 8/1974 | (DE) . |
| 2437990 | 2/1976 | (DE) . |
| 383932 | 4/1990 | (DE) . |
| 2018641 | 10/1991 | (DE) . |
| 77 09399 | 10/1978 | (FR) . |
| 196452 | 4/1923 | (GB) . |
| 753652 | 7/1956 | (GB) . |
| 801281 | 9/1958 | (GB) . |
| 803994 | 11/1958 | (GB) . |
| 1435687 | 5/1976 | (GB) . |
| 4863 506/06 | 6/1992 | (RU) . |
| WO 9505063 | 2/1995 | (WO) . |

* cited by examiner

Primary Examiner—Charles G. Freay
(74) Attorney, Agent, or Firm—Hughes Hubbard & Reed LLP; Ronald Abramson; Peter Sullivan

(57) ABSTRACT

In a gas turbine engine bladed disk (36) positioned between rotor disk (14) and combustor (16). Bladed disk (36) is mounted for rotation together with rotor disk (14) and has blades (38) projecting toward inlet portion (20) of combustor (16). The bladed disk has openings (40) between blades (38) for establishing communication between source of compressed fluid (12) and turbine blades (15). Seals (46, 48) are provided between bladed disk (36) and casing (10).

11 Claims, 4 Drawing Sheets

GAS TURBINE ENGINE HAVING A BLADED DISK

The invention relates to the field of gas turbine engines, and more specifically, to an improved gas turbine engine using a rotating fluid flow train to feed the combustor and enhance air/fuel mixing.

BACKGROUND OF THE INVENTION

A type of prior art gas turbine engine has a compressor, a fuel source, a combustion air source, a casing, and a combustor to prepare a heated fluid from fuel and combustion air. The combustor is connected to the fuel source, to the combustion air source and also to the compressor, which changes the pressure of the heated fluid before feeding it to the turbine. Practically the entire fluid flow from the compressor is directed to the combustor. The engine has a turbine rotor disk with blades that receive the heated fluid from the combustor. As the turbine rotor disk rotates during engine operation, the heated fluid flow coming from the combustor has to be directed at an angle to the blades to ensure smooth entry conditions. This is done using stator vanes that are positioned at a certain angle and direct the heated fluid from the combustor to the turbine rotor disk in a manner compatible with rotor disk rotation. This gas turbine engine is disclosed in U.S. Pat. No. 3,826,084 to Branstrom et al.

The stator vane angle normally is chosen to optimize efficiency based on prevailing turbine rotor disk operating conditions (speed). This solution is quite acceptable for gas turbine engines that have more or less steady operating conditions, such as when used for power generation. In applications where the load upon the gas turbine engine is steady, the turbine rotor disk rotates at a steady speed, and the entry angle for the blades remains unchanged thus minimizing losses. If, on the other hand, this gas turbine engine is used to power a vehicle, the situation is radically different. In that application, the turbine rotor disk speed will vary within a broad range depending on vehicle load. Consequently, the entry angle also varies within a broad range under load fluctuations, which leads to greater losses. This problem could not be solved by using the conventional approach with the stator vanes. It is possible to use controllable stator vanes to change the entry angle at the blades, but it is a very complicated and expensive solution given the high temperatures downstream of the combustor and space limitations. As a result, the gas turbine engine would have high losses in vehicle applications. Moreover, the stator and vanes occupy an additional space and make the engine design more complicated and expensive. The use of controllable vanes makes the engine less reliable.

The above problems are eliminated in our pending patent application Ser. No. 09/161,104 for a gas turbine engine, filed Sep. 25, 1998. A gas turbine engine disclosed in the above-mentioned as turbine engine has a device to admit a rotating fluid flow from an annular space in the casing to the inlet portion of a combustor to form a rotating fluid flow in the inlet portion of the combustor. The rotating fluid flow is formed in the annular space of the casing by supplying a fluid from a compressor to the blades of the turbine rotor disk. The fluid flow in an inlet portion of the combustor has a spin imparted to the fluid by rotation of the turbine rotor blades.

The disadvantage of the above gas turbine engine is an unstable clearance between the turbine rotor blade and the combustor. This is due largely to temperature fluctuations, temperature induced changes in rotor disk diameter, axial rotor disk displacement and wear on the bearings. These clearance changes between the rotor blades and combustor result in fluctuations of the overall fluid flow, including the flow through the combustor. It is imperative to use very stringent manufacturing tolerances in order to compensate for these negative phenomena to the maximum extent possible. In addition, the spin imparted to the fluid in the combustor by the turbine blades can be too strong if the blade radius is large. If the fluid spin in the combustor is too strong, the combustor may suffer high hydraulic losses, which lowers efficiency.

The problems indicated above are solved in the gas turbine engine of this invention.

SUMMARY OF THE INVENTION

It is an object of the invention to provide a gas turbine engine of the above type that has a higher efficiency.

Another object of the invention is provide a gas turbine engine of the above type that has a simplified combustor control system.

A further object of the invention is to provide a gas turbine engine that is less expensive to manufacture.

The foregoing objects are accomplished through the design of a gas turbine engine in which a combustor has an annular inner wall and an annular guide wall defining therewith an inlet portion, and a turbine rotor disk has a bladed disk positioned between the rotor disk and combustor. The bladed disk is mounted for rotation together with the rotor disk and has its blades projecting toward the inlet portion of the combustor. Seals are provided between the bladed disk and the casing.

Other objects and advantages of the invention will become apparent from the following detailed description of preferred embodiments and accompanying drawings.

DETAILED DESCRIPTION OF THE DRAWINGS

Figure 1:
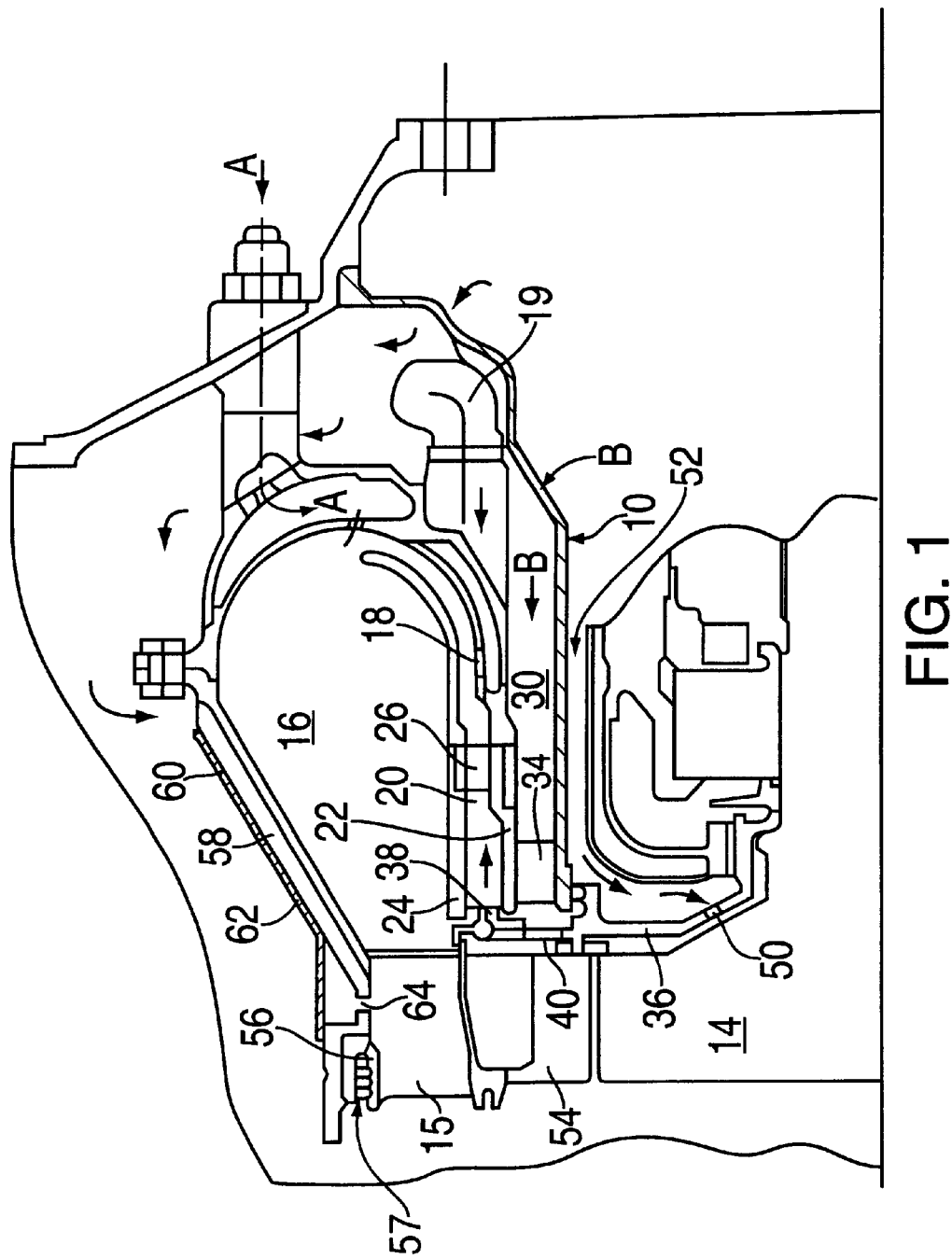
FIG. 1 shows a diagrammatic view of a gas turbine engine according to the invention in a sectional view.

With reference to FIG. 1, a gas turbine engine has a casing 10, a compressor 12 (shown in FIG. 2) for supplying a compressed fluid, a turbine rotor disk 14 mounted downstream of compressor 12, a combustor 16 to prepare a heated fluid to be supplied to turbine rotor disk 14. Combustor 16 has a port 18 to admit fuel supplied from a fuel source 19. Combustor 16 defines a combustion zone in which the heated fluid is formed. Combustion air is supplied from an air source (not shown) in the direction shown by arrows A.

The inlet portion of the combustor shown at 20 is defined by an inner annular wall 22 of combustor 16 and by an annular guide wall 24 that extends within the combustor in a spaced relation to inner annular wall 22. Annular guide wall 24 is installed by pins 26 in such a manner that a space is left for fluid passage.

A part of the fluid from compressor 12 is supplied to turbine rotor disk 14, bypassing combustor 16, as shown by arrow B, through passage 30 in casing 10 and reaching a zone 32 upstream of turbine rotor disk 14. Vanes 34 can be provided in passage 30 to make this fluid flow compatible with the turbine rotor disk 14 rotation. These vanes will function in an optimum manner only under certain turbine engine operating conditions. Since the quantity of fluid that is fed to the turbine rotor disk 16 and the velocity of this fluid are not very high, losses that would occur under non-optimum conditions would be relatively low.

A bladed disk 36 is mounted for rotation together with turbine rotor disk 14 and has blades 38. Blades 38 project toward inlet portion 20 of combustor 16 and fluid that flows through passage 30 in zone 32 moves under the action of centrifugal forces into passages between blades 38. Blades 38 impart a spin to this fluid in inlet portion 20 of combustor 16. As a result, the fluid in the space between inner annular wall 22 and annular guide wall 24 rotates in the direction of rotation of turbine rotor disk 14. This rotating flow of fluid imparts the same spin to a fuel and air mixture formed by fuel that is admitted through port 18 and air shown by arrow A, whereby heated fluid that is prepared by burning fuel in combustor 16 will also have the same spin before reaching blades 15 of turbine rotor disk 14.

Figure 2:
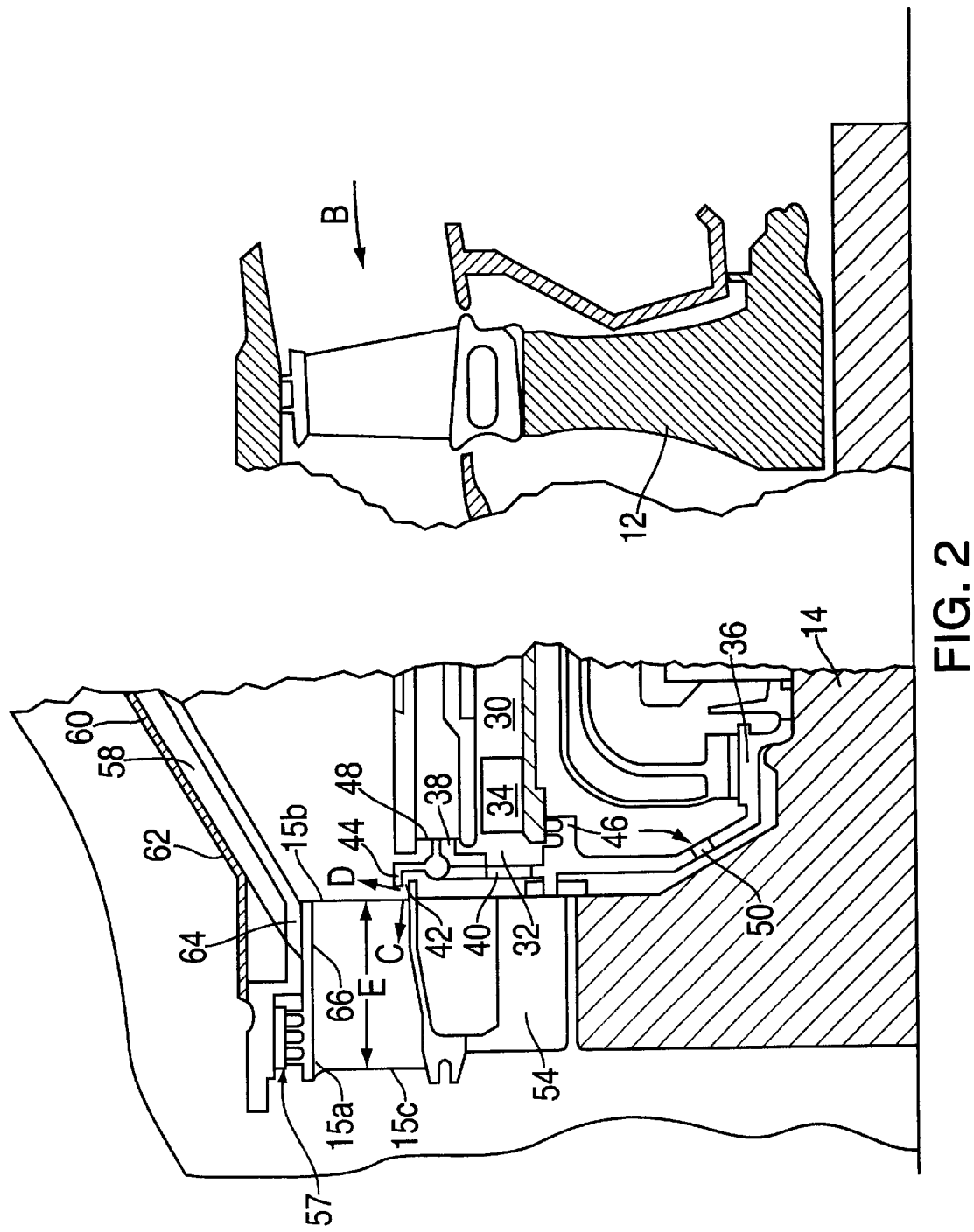
FIG. 2 shows a part of the gas turbine engine shown in FIG. 1 (enlarged view).
Figure 3:
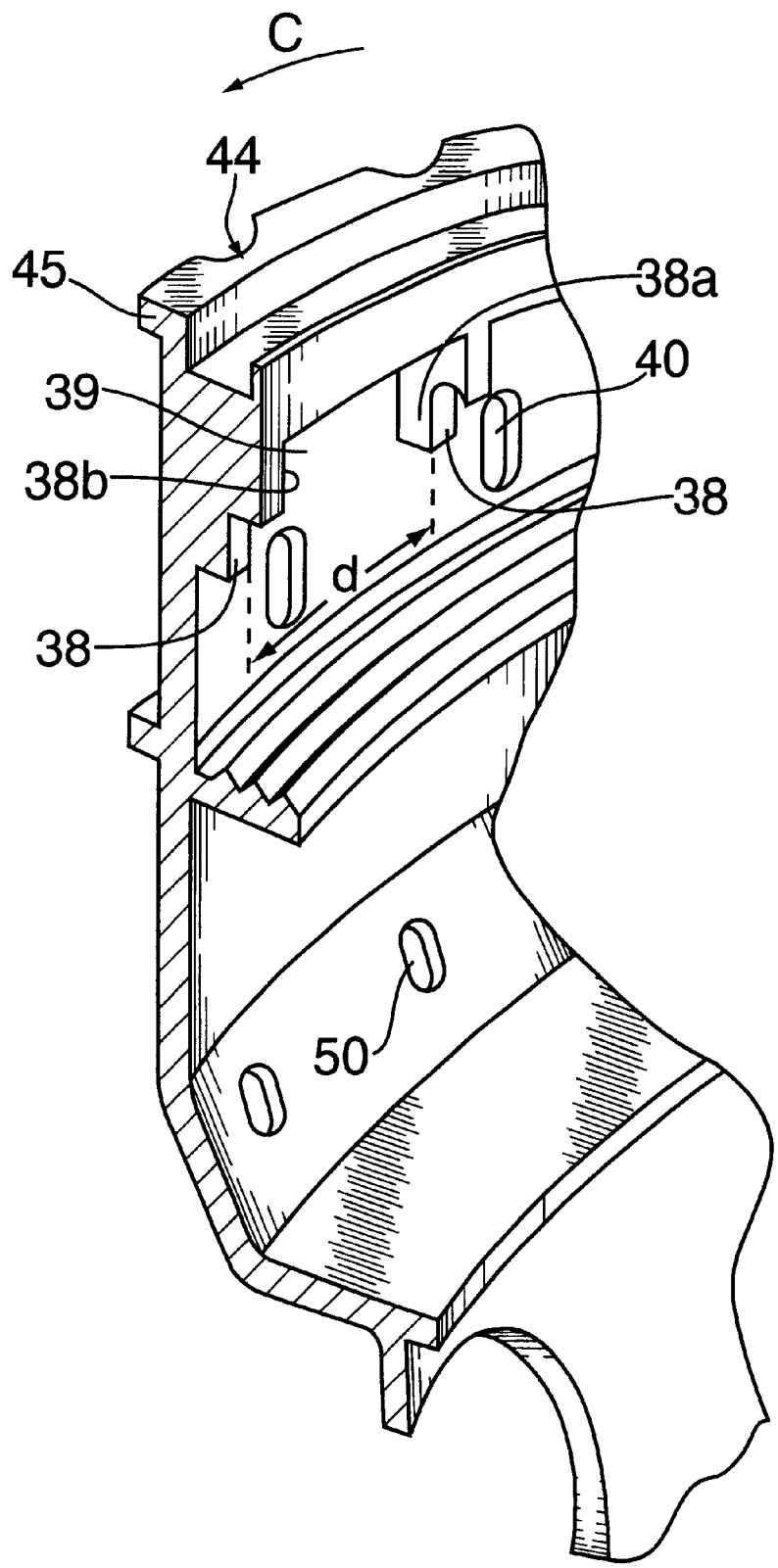
FIG. 3 is a perspective partial view of a bladed disk according to the invention.
Figure 4:
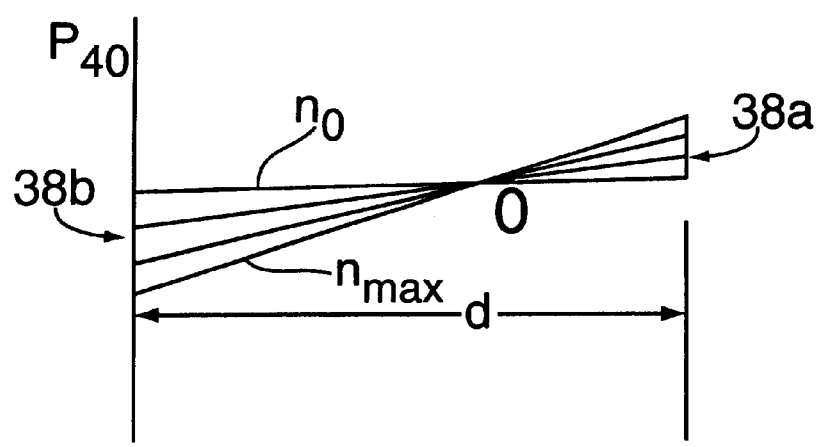
FIG. 4 is a pressure diagram illustrating operation of the gas turbine engine according to the invention.

In FIG. 2, bladed disk 36 has openings 40 that establish communication between passage 30 and a space 42 between the bladed disk and turbine blade 15. A part of the fluid from passage 30 passes through opening 40 and through space 42 to blade 15. This fluid then moves as shown by arrow C along the root portion of blade 15 and as shown by arrow D in the radial direction along the length of blade 15. Under the effect of heated fluid coming from the combustion zone of combustor 16, the flow of fluid shown by arrow D will form a layer of cooling fluid over blade 15. This assures the cooling of the blade. This fluid flow moves along arrow D through recessed portions 44 of a flange 45 of bladed disk 36, as shown in FIG. 3. Openings 40 are located between blades 38. Each blade 38 has a pressure side 38a and a suction side 38b that follows pressure side 38a in the direction of rotation of bladed disk 36, as shown by arrow C. Pressure side 38a of one blade 38 and suction side 38b of the adjacent blade 38 define a passage 39 that has a width D. Each opening 40 is located closer to suction side 38b of one of adjacent blades 38, within a zone that extends over one half of the width D of passage 39. FIG. 4 shows a graph of pressure $P_{40}$ at opening 40 versus position of opening 40 relative to sides 38a and 38b for different speed values of the gas turbine from $n_{max}$ to n=0, with opening 40 positioned closer to side 38b of blade 38 within one half of the space between sides 38a and 38b, pressure $P_{40}$ decreases with an increase in gas turbine speed. At higher gas turbine speeds, lower amounts of fluid pass through opening 40 to blades 15 of the turbine and greater amounts of fluid enters combustor 16. This is necessary to assure the required quantity of air to prepare the fuel and air mixture at high speeds. It will be apparent that this arrangement assures automatic control of combustion conditions in combustor 16 without any special control mechanism. While opening 40 may be of any shape, it is preferred that opening 40 be elongated in the radial direction.

A seal 46 such as a labyrinth seal is provided between bladed disk 36 and the casing 10 (a wall of passage 30) and a seal 48 is provided between bladed disk 36 and annular guide wall 24. This allows the flow of fluid from passage 30 and the flow of fluid into inlet portion 20 of combustor 14 to move in a controlled manner and with minimized losses.

It can be understood from the above that the fluid flow that is used for imparting a spin to the fluid flow in combustor 16 and the fluid flow that is used for cooling blade 15 are determined by the position of bladed disk 36 with respect to turbine rotor disk 14. This means that the spin imparted to the fluid in combustor 16 will be exactly the amount necessary for a given gas turbine engine.

It should be noted that the amount of spin can be controlled by specifying the radius of blade 38. If the spin was provided by blades 15 of the turbine rotor disk, the amount of spin would be too strong (because it is determined by the radius of the turbine blades) and could not be changed. Bladed disk 36 has openings 50, and a part of fluid from compressor 12 goes through a passage 52 and through openings 50 for cooling rotor disk 14 and a root 54 of blade 15.

It is also understood that the flow rate of the fluid cooling blade 15 will be determined exactly by the amount of space 42 and the size of recessed portion 44 of flange 45 of bladed disk 38. Because bladed disk 36 is mounted on turbine rotor disk 14, it is simple to assure their accurate relative positioning. This design concept allows the flow conditions in the blade cooling zone and in the zone where the spin is imparted to the fluid flow to be stable and independent of the position of turbine rotor disk 14 with respect to combustor 16 and the casing 10 of the gas turbine engine.

The invention was described with reference to the preferred embodiments. Various changes and modifications can be made, however, without going beyond the spirit and scope of the invention as defined in the attached claims.

What is claimed is:

1. A gas turbine engine, said gas turbine engine comprising:
   a source of compressed fluid flow;
   a fuel source;
   a combustion air source;
   a casing;
   a combustor in said casing, said combustor having an annular inner wall and an annular guide wall extending in a spaced relation to said annular inner wall and defining therewith an inlet portion, said combustor communicating with said fuel source and with said combustion air source to prepare a heated fluid;
   a turbine rotor disk with turbine blades, said turbine blades positioned immediately downstream of said combustor for receiving said heated fluid from said combustor;
   a means for imparting a spin to said heated fluid within said combustor, said means comprising a bladed disk positioned between said rotor disk and combustor, said bladed disk being mounted for rotation together with said rotor disk, having blades projecting toward said inlet portion of said combustor and openings between said blades, said openings establishing communication between said source of compressed fluid and said turbine blades; and
   a sealing means between said bladed disk and said casing.

2. The gas turbine engine of claim 1, wherein said openings are elongated in the radial direction of said bladed disk.

3. The gas turbine engine of claim 1, wherein each of said blades has a pressure side and a suction side that follows said pressure side in the direction of rotation of said turbine disk, said pressure side and said suction side defining a passage that is located between adjacent blades of said blades of said bladed disk and that has a width, each of said openings being located closer to said suction side within a zone that extends over one half of said width of said passage.

4. The gas turbine engine of claim 3, wherein said openings are elongated in the radial direction of said bladed disk.

5. The gas turbine engine of claim 1, wherein said bladed disk has a flange, said flange having an inner periphery, an end face that faces toward said rotor disk, and a periphery, said periphery having recessed portions at points opposite to said turbine blades, said turbine blades being received in said recessed portions and said inner periphery of said flange communicating with said source of compressed fluid.

6. The gas turbine engine of claim 5, wherein each of said blades has a pressure side and a suction side that follows said pressure side in the direction of rotation of said turbine disk, said pressure side and said suction side defining a passage that is located between two adjacent blades of said blades of said bladed disk and that has a width, said openings being located closer to said suction side within a zone that extends over one half of said width of said passage.

7. The gas turbine engine of claim 6, wherein said openings are elongated in the radial direction of said bladed disk.

8. A gas turbine engine comprising:

a source of compressed fluid flow;

a fuel source;

a combustion air source;

a casing;

a combustor in said casing, said combustor having an annular inner wall, said annular wall extending inwardly with respect to said combustor in a spaced relation thereto, and an annular guide wall extending in a spaced relation to said annular inner wall and defining therewith an inlet portion, said combustor communicating with said fuel source and with said combustion air source to prepare a heated fluid;

a turbine rotor disk with turbine blades, said turbine blades positioned immediately downstream of said combustor for receiving said heated fluid from said combustor;

a means for imparting a spin to said heated fluid within said combustor, said means comprising a bladed disk positioned between said rotor disk and combustor, said bladed disk being mounted for rotation together with said rotor disk, having blades projecting toward said inlet portion of said combustor and openings between said blades, said openings establishing communication between said source of compressed fluid and said turbine blades;

a sealing means comprising a first seal provided between said bladed disk and said inner annular guide wall and a second seal provided between said bladed disk and said casing.

9. The gas turbine engine of claim 8, wherein said openings are elongated in the radial direction of said bladed disk.

10. The gas turbine engine of claim 8, wherein each of said blades has a pressure side and a suction side that follows said pressure side in the direction of rotation of said turbine disk, said pressure side and said suction side defining a passage that is located between adjacent blades of said blades of said bladed disk and has a width, each of said openings being located closer to said suction side within a zone that extends over one half of said width of said passage.

11. The gas turbine engine of claim 10, wherein said openings are elongated in the radial direction of said bladed disk.

* * * * *